No. 692,114. Patented Jan. 28, 1902.
T. CALLISTER.
WAGON BRAKE.
(Application filed Oct. 21, 1901.)
(No Model.) 2 Sheets—Sheet 1.
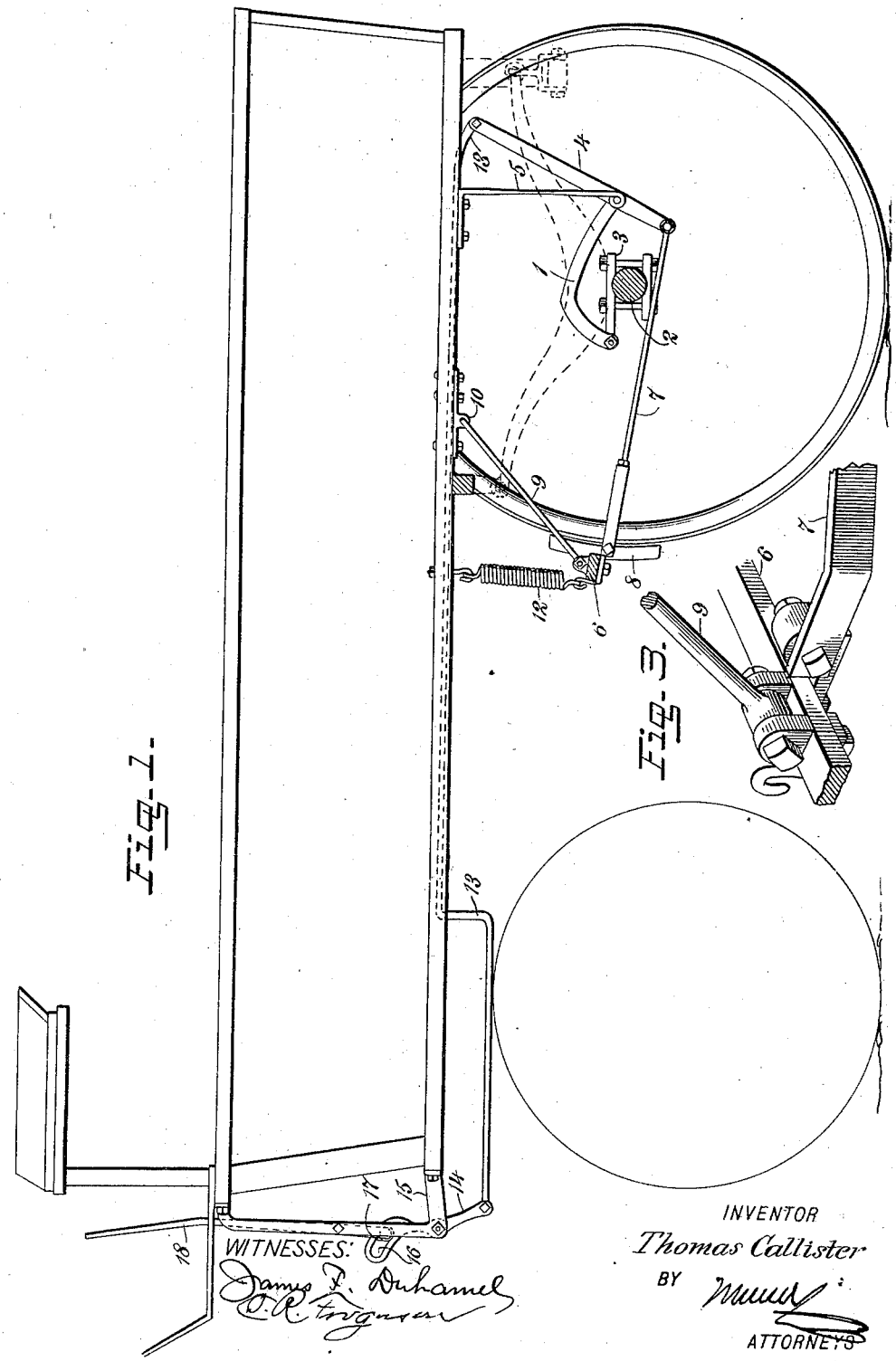
INVENTOR
Thomas Callister
BY
ATTORNEYS

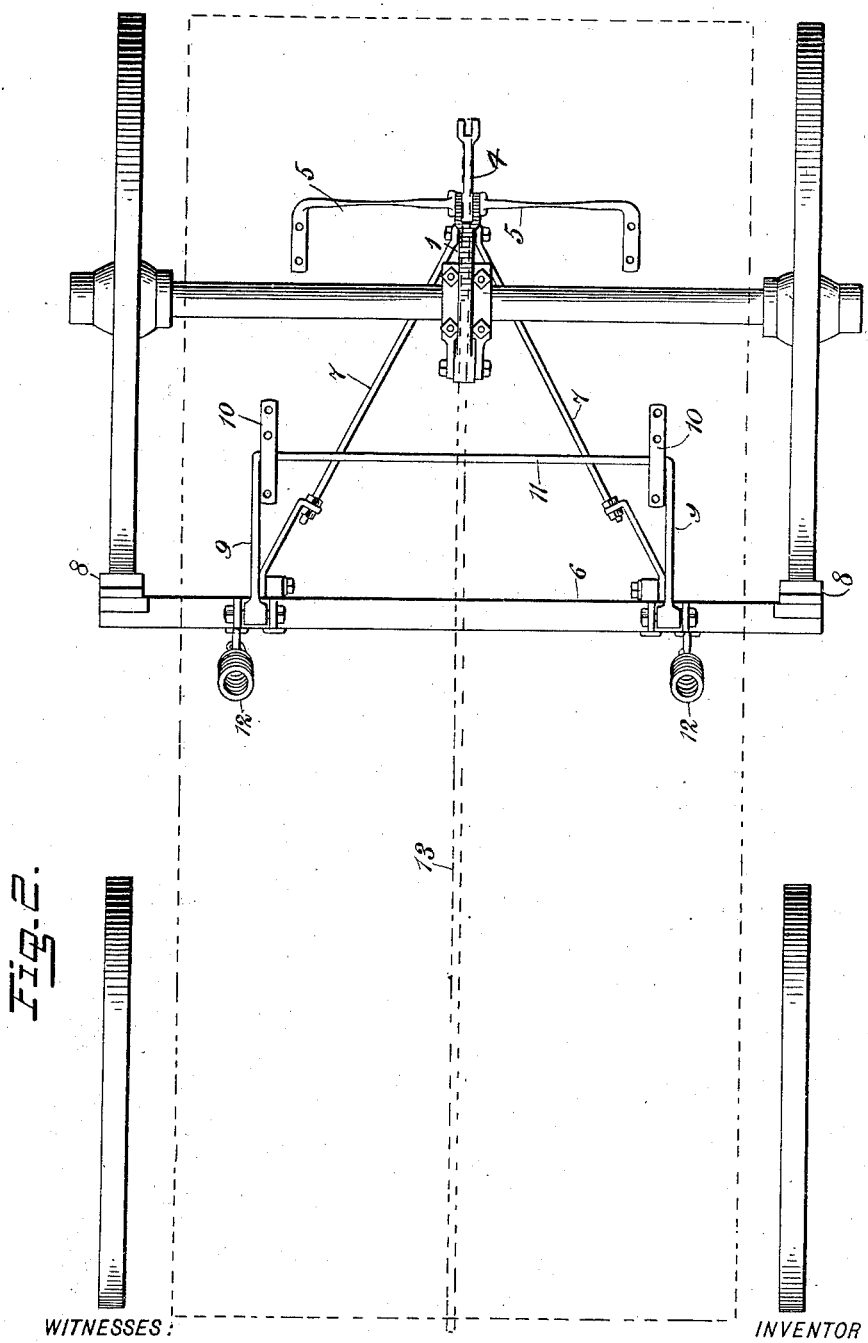

UNITED STATES PATENT OFFICE.

THOMAS CALLISTER, OF NEW YORK, N. Y.

WAGON-BRAKE.

SPECIFICATION forming part of Letters Patent No. 692,114, dated January 28, 1902.

Application filed October 21, 1901. Serial No. 79,403. (No model.)

*To all whom it may concern:*

Be it known that I, THOMAS CALLISTER, a citizen of the United States, residing in the city of New York, (Queens, borough of Queens,) in the county of Queens and State of New York, have invented a new and Improved Wagon-Brake, of which the following is a full, clear, and exact description.

This invention relates to improvements in brakes for heavy wagons of the kind in which the body is supported on springs. Having found by practical experience that brakes having their main parts supported entirely on the axle are objectionable, because by their shaking in the joints with every rise and drop of the vehicle while passing over a road-bed they become annoying by the rattle and expensive to keep in repair, it is the object of my invention to provide an improved form of brake which will be equally effective for securely holding the wheels of a heavy wagon against rotation when descending a hill in case the wagon is loaded or unloaded and in which the rear or actuating lever and all joints excepting one are supported by the body of the vehicle, and thus relieved through the medium of the springs of much of the jarring and shaking. Furthermore, with my brake the pressure when applied from the front is brought to bear against the axle, and when the springs expand the axle, together with the wheels and brake, is carried backward, the brake-shoes retaining their same relative distance from the axle under all circumstances.

I will describe a wagon-brake embodying my invention and then point out the novel features in the appended claims.

Reference is to be had to the accompanying drawings, forming a part of this specification, in which similar characters of reference indicate corresponding parts in all the figures.

Figure 1 is a side elevation of a wagon-brake embodying my invention and showing the same as applied to a wagon, parts being in section. Fig. 2 is an inverted plan view thereof, and Fig. 3 is a perspective view showing the brake-beam adjustments.

Referring to the drawings, 1 designates the fulcrum-arm, supported on the rear axle 2 at its longitudinal center. As here shown, this fulcrum-arm is pivoted to a shackle-plate 3, secured by a suitable clip to the axle and extended forward therefrom, so that the pivotal point of the arm is forward of the axle. The free end, however, of the arm extends rearward of the axle, and in this free end is fulcrumed the brake-lever 4. The arm 1, as clearly shown in the drawings, is longitudinally curved, so as not to come in contact with the axle upon downward movements of the vehicle-body.

The arm 1 and lever 4 are supported by means, as here shown, of hangers 5, which are divergent and secured at their upper ends to the bottom of the wagon, the lower ends engaging with the bolt attaching the lever to the arm. These hangers 5 are flattened between their ends, so as to have a yielding movement as the body of the vehicle rises and falls. In other words, the said hangers will vibrate slightly as the springs expand with the load, and thereby move the lower ends backward and forward so much as the center of the axle to which they are indirectly connected moves backward and forward by reason of said expansion.

The brake-beam 6 is connected by draw-rods 7 with the lower end of the lever 4. These rods 7 are divergent from said lever and connect pivotally with the brake-beam near its ends. On the extreme ends of the beam are the shoes 8 for engaging with the forward portions of the rear wheels. The rods 7 preferably consist each of two sections, so that their length may be readily adjusted.

The brake-beam 6 is supported from the vehicle-body by means of hangers 9, which are pivotally connected to the beam and extend upward and rearward and have bearings in blocks 10, attached to the bottom of the vehicle-body. As here shown, the two hangers 9 are extended from the end of a cross-shaft 11. By inclining the hangers 9 forward and rearward the brake-beam when drawn toward the wheel will be caused to move downward somewhat, bringing the brake-shoes in tight contact with the wheels substantially in a horizontal plane with the center of the axle. The brake-shoes are held normally out of contact with the wheels and in their upper position, as indicated in Fig. 1, by springs 12, connecting at their lower ends with the brake-beam and at their upper ends with hooks attached to the bottom of the vehicle-body.

From the upper end of the brake-lever 4 a draw-bar 13 extends along the under side of the body and connects pivotally at its forward end with the lower end of a rock-lever 14, mounted to swing in a bracket 15, attached to the front of the wagon-body. The upper end of this lever 14 is inclined forward and upward and is provided with a slot 16 to receive the roller-bearing 17, mounted on the lower end of the foot-lever 18, the said foot-lever being pivoted to the bracket 15 and extended upward through an opening in the footboard of the wagon.

It will be seen that in my construction of brake there is but one direct joint connection between the device and the vehicle-axle—that is, the pivotal connection of the fulcrum-arm.

In operation, as before stated, the brake-beam or the shoes thereof will at all times keep practically the same distance from the axle whether the wagon be loaded or light. By pushing forward on the upper end of the foot-lever 18 the lever 14 will be rocked, which will swing the lever 4, causing the brake-shoes to bind tightly against the wheels, the hangers 9, as before stated, aiding materially in the pressure, as they carry the brake-shoes slightly downward on the wheels. In operating the lever 4 the free end of the arm 1 will be drawn slightly upward, as the hangers 5 will yield sufficiently to permit such upward movement, thus keeping the fulcrum-point of the lever practically in line with the axle when the vehicle is loaded.

Having thus described my invention, I claim as new and desire to secure by Letters Patent—

1. In a wagon-brake, a fulcrum-arm extended rearward from the wagon-axle and having a vertical movement relatively thereto, spring-rod connections between said arm and the wagon-body, a brake-lever pivoted to the arm in the rear of the axle, a brake-beam, and connections between the beam and said lever, substantially as specified.

2. In a wagon-brake, a fulcrum-arm having a pivotal connection with the vehicle-axle, the said connection being forward of the axle and the free end of the arm being rearward of the axle, a brake-lever fulcrumed in said free end, spring-hangers supporting the arm from the body of the vehicle, a brake-beam suspended from the body, and connections between said brake-beam and the lever, substantially as specified.

3. A wagon-brake, comprising a fulcrum-arm having swinging connection with the wagon-axle, spring-yielding hangers supporting the arm from the vehicle-body, a brake-lever mounted in the free end of the arm, a brake-beam, hangers extended from said brake-beam at an upward and rearward incline to pivotal connection with the vehicle-body, and a spring connection between said beam and the vehicle-body, substantially as specified.

4. A wagon-brake, comprising an arm mounted on the rear axle of the vehicle and extended rearward therefrom, a brake-lever pivoted in said rear end, a brake-beam having connection with the lower end of said lever, swinging connections between said beam and the vehicle-body, a draw-bar extended from the upper end of said lever along the under side of the vehicle, a lever to which the forward end of said bar is connected, the upper portion of said lever being provided with an upwardly and forwardly inclined slot, a foot-lever, and a roller on the lower end of said foot-lever for engaging in said slot, substantially as specified.

5. A wagon-brake, comprising a fulcrum-arm having swinging connection with the wagon-axle and extended rearward therefrom, spring-yielding hangers connecting the rear end of said arm to the vehicle-body, the said hangers being divergent, a brake-lever pivoted to the end of said arm, a brake-beam, divergent draw-rods connecting said beam with the lever, hangers extended upward and rearward from the beam and having pivotal connection with the vehicle-body, and a draw-bar extended from the upper end of the lever to the front portion of the vehicle, substantially as specified.

In testimony whereof I have signed my name to this specification in the presence of two subscribing witnesses.

THOMAS CALLISTER.

Witnesses:
JNO. M. RITTER,
C. R. FERGUSON.